United States Patent
Hayashi et al.

(10) Patent No.: US 6,800,313 B2
(45) Date of Patent: Oct. 5, 2004

(54) METHOD FOR SUPPLYING FOOD DOUGH

(75) Inventors: Torahiko Hayashi, Utsunomiya (JP); Michio Morikawa, Utsunomiya (JP); Shigeo Uesawa, Utsunomiya (JP); Eiji Kuribayashi, Utsunomiya (JP)

(73) Assignee: Rheon Automatic Machinery Co. Ltd., Tochigi-Ken (JP)

(*) Notice: Subject to any disclaimer, the term of this patent is extended or adjusted under 35 U.S.C. 154(b) by 0 days.

(21) Appl. No.: 10/600,649

(22) Filed: Jun. 23, 2003

(65) Prior Publication Data

US 2004/0009253 A1 Jan. 15, 2004

Related U.S. Application Data

(62) Division of application No. 10/336,807, filed on Jan. 6, 2003, now Pat. No. 6,685,457, which is a division of application No. 09/959,216, filed as application No. PCT/JP00/07987 on Oct. 22, 2001, now Pat. No. 6,524,090.

(30) Foreign Application Priority Data

Feb. 21, 2000 (JP) .......................... 2000-042912

(51) Int. Cl.[7] .................... A21D 8/00; G01N 33/00
(52) U.S. Cl. ............... 426/231; 426/502; 426/503; 426/518
(58) Field of Search ................ 426/231, 496, 426/502, 503, 518; 425/140, 148, 296, 308

(56) References Cited

U.S. PATENT DOCUMENTS

| | | | |
|---|---|---|---|
| 4,849,234 A | 7/1989 | Spinelli et al. | 426/231 |
| 4,880,371 A | 11/1989 | Spinelli et al. | 425/135 |
| 5,158,792 A | 10/1992 | Morikawa et al. | 426/231 |
| 5,209,939 A * | 5/1993 | Kempf | 426/231 |
| 5,292,539 A | 3/1994 | Tashiro et al. | 426/231 |
| 5,409,721 A | 4/1995 | Rademaker | 426/496 |
| 6,045,840 A | 4/2000 | Morikawa et al. | 426/231 |

FOREIGN PATENT DOCUMENTS

| | | |
|---|---|---|
| EP | 0 145 351 | 6/1985 |
| JP | 46-6932 | 12/1971 |
| JP | 55-104832 | 2/1982 |
| JP | 7-236407 | 9/1995 |
| JP | 11-127764 | 6/1999 |

* cited by examiner

*Primary Examiner*—George C. Yeung
(74) *Attorney, Agent, or Firm*—Finnegan, Henderson, Farabow, Garrett & Dunner L.L.P.

(57) ABSTRACT

An apparatus for supplying food dough forms blocks of food dough that are continuously supplied into a sheet or belt of food dough and then divides it into chunks of food dough that have preset weights.

The apparatus for supplying food dough comprises a hopper to which a large block of food dough is supplied, a cutting apparatus located at a lower opening port of the hopper to cut the block into small blocks that have substantially the same volume,
  a dough feeder having a plurality of rollers that are arranged as a V to form the small blocks into a sheet of the food dough, a transferring conveyor to transfer the small blocks to the dough feeder, a feeding conveyor to convey the sheet of the food dough that is formed by the dough feeder to have a constant thickness, a weighing conveyor measuring the weight of a part of the sheet that is supplied by the feeding conveyor as the sheet is being conveyed, and a cutting apparatus for cutting the sheet of the food dough when the measurement of the weighing conveyor corresponds to a preset value.

2 Claims, 12 Drawing Sheets

METHOD FOR SUPPLYING FOOD DOUGH

This is a division of application Ser. No. 10/336,807 filed Jan. 6, 2003, now U.S. Pat No. 6,685,457 which is a division of application Ser. No. 09/959,216 filed Oct. 22, 2001, now U.S., Pat. No. 6,524,090, which is a 371 of PCT/JP00/07987 filed Nov. 13, 2000, all of which are incorporated herein by reference.

TECHNICAL FIELD

This invention relates to an apparatus for supplying food dough such as confectionary dough, bread dough, or other dough made of flour. Particularly, it relates to an apparatus and a method for forming food dough into a belt or sheet, and then cutting it into pieces of food dough that have predetermined weights, so that they can be continuously made.

BACKGROUND OF INVENTION

Usually, when food dough is prepared by a manufacturing line, the system called a four-row line system is used for such a manufacturing line. It has a mechanism having a piston and cylinder. After the cylinder is filled with a block of bread dough, the block is rotated and cut into pieces that have predetermined sizes. As a result, a high pressure and a large shearing stress may be given to the bread dough, so that the structure of the gluten in the dough can be broken. To recover that structure a chemical additive and an overhead proofer are used. The proofer is used in a step that is carried out after the step for rolling the bread dough, so as to give it a rest, so that the structure can be recovered. Such an apparatus is large. The proofer is additional. Thus, the line that includes it is large. Thus, a small apparatus is desired. Also, it is desired that a high-quality bread be made.

Japanese Patent Laid-open Publication No. 11-155464 discloses an apparatus for supplying food dough. It has a hopper to which a large block of food dough is supplied. Also, it has a cutter that is located below the lower opening of the hopper. The large block of the food dough that is supplied to the hopper is cut into pieces that have predetermined lengths and constant volumes. Those pieces are fed by a conveyor that is located below the cutter into a forming hopper. That hopper has a dough-feeder section that is comprised of a plurality of rollers that are arranged as a V. When the dough is supplied to that section, it is formed into a sheet by the plurality of the rollers of the dough feeder. Then, it is put on a conveyor that is located below the dough feeder, and transferred to a following apparatus to be processed by it.

The apparatus for supplying food dough allows a large block of food dough to be continuously formed as a sheet. Then, pieces of the dough are cut out from it. In that case, scraps of food dough may remain. They do not have any certain sizes and thus cannot usefully be used. Thus, it is desired that a system can usefully use the scraps to prevent them from being wasted.

Japanese Patent Laid-open Publication Nos. 46-6932 and 60-110237 disclose an apparatus for cutting a dough sheet into pieces that have predetermined weights. It feeds a dough sheet along its length. Then, a weighing apparatus continuously measures the weight of the dough sheet as the sheet is being fed. When the weight corresponds to a predetermined value, a cutter is operated to cut the sheet into a piece of dough that has a predetermined weight. For example, the cutter is located in a facility for making bread or confectionery, and is used to prepare a piece of dough that has a predetermined weight.

The kind and shape of bread varies depending on the variations in taste. Thus, it is desired that an apparatus for preparing bread or confectionery make many kinds and various shapes of them.

The applicant of this application proposes some kinds of apparatuses for first forming food dough into a sheet of dough. Also, it proposes an apparatus for making some kinds of food products that are made from the sheet of dough after it is cut into pieces that have various weights according to the kinds of products. The prior-art apparatus only measures a narrow range of weights of the sheet of dough when it is cut into pieces. Thus, it is desired that it have a cutting apparatus that can measure a wider range of weights, so that many kinds of products can be made.

The kinds of weights and sizes of products that the conventional apparatus can make are few. Thus, an apparatus and method for cutting food dough is desired that can make products having various weights and sizes over a wide range.

SUMMARY OF INVENTION

To overcome the disadvantages discussed above this invention was conceived. According to the first concept of this invention, an apparatus for supplying food dough is provided. The apparatus is comprised of a hopper to which a large block of food dough is supplied, a cutting apparatus located at the lower opening port of the hopper to cut the block into small blocks that have substantially the same volume, a dough feeder having a plurality of rollers that are arranged as a V to form the small blocks into a sheet of food dough, a transferring conveyor to transfer the small blocks to the dough feeder, a feeding conveyor to convey the sheet of the food dough that is formed by the dough feeder so that it has a constant thickness, a weighing conveyor measuring the weight of the part of the sheet that is conveyed by the feeding conveyor and that is put on the weighing conveyor as the sheet is being conveyed, and a cutting apparatus for cutting the sheet of food dough when the measurement by the weighing conveyor corresponds to a preset value.

The weighing conveyor includes first and second weighing conveyors that are serially arranged in the feeding direction. The second weighing conveyor again measures the part of the sheet of the food dough that is cut out from the sheet after it is measured by the first weighing conveyor. The timing of the cutting operation of the cutting apparatus is accelerated or delayed, when the measurement of the second weighing conveyor does not correspond to the preset value.

Both the first and second weighing conveyors can together measure a part of the sheet of the food dough. The sum of the measurements is compared with the preset value.

The second weighing conveyor again measures the part of the sheet of the food dough that is cut out from the sheet after it is measured by the first weighing conveyor. The timing of the cutting operation of the cutting apparatus is accelerated or delayed, when the measurement of the second weighing conveyor does not correspond to the preset value.

A flour-supplying apparatus may be located upstream of the feeding conveyor. It supplies flour to the feeding surface of the feeding conveyor to prevent the sheet of the food dough that is supplied from the dough feeder from adhering to the feeding surface.

Also, a pair of flour-supplying apparatuses may be appropriately located. They can be located near the side surfaces of the feeding conveyor to supply flour to the sides of the sheet of food dough that is supplied by the dough feeder and conveyed by the feeding conveyor.

A flour-supplying apparatus may be located downstream of the feeding conveyor. It supplies flour on the upper surface of the sheet of food dough.

An apparatus is located downstream of the feeding conveyor to remove flour from the bottom surface of the sheet of food dough that is conveyed by the feeding conveyor.

An apparatus is located downstream of the flour-supplying apparatus to remove flour from the upper surface of the sheet of food dough. The flour is supplied by the flour-supplying apparatus.

A photo sensor may be located near the input port of the dough feeder. It monitors food dough deposited at a given position on the dough feeder. Based on the results of the monitoring, the feeding speed of the transferring conveyor is controlled to keep constant the input of the food dough from the transferring conveyor.

Also, a photo sensor may be located near the output port of the dough feeder. It monitors food dough that is output from the dough feeder and put on the feeding conveyor. Based on the results of the monitoring, the speed of the output of the dough feeder is controlled to prevent the sheet of the sheet of the food dough that is output from the dough feeder from being loose.

The second weighing conveyor may be longer than the first weighing conveyor.

The upstream end of the weighing conveyor is arranged at a position that is higher than that of the downstream end of the feeding conveyor. The cutting apparatus is located between the position where the sheet of the food dough starts to be taken off the feeding conveyor and the position where the sheet of food dough starts to contact the weighing conveyor.

According to the second concept of this invention, another apparatus for supplying food dough is provided. The apparatus is comprised of a hopper to which a large block of food dough is supplied, a cutting apparatus located at a lower opening port of the hopper to cut the block into small blocks that have substantially the same volume, a dough feeder having a plurality of rollers that are arranged as a V to form the small blocks into a sheet of the food dough, a transferring conveyor to transfer the small blocks to the dough feeder, a feeding conveyor to convey the sheet of the food dough that is formed by the dough feeder to have a constant thickness, an alignment apparatus to adjust the center of the sheet of the food dough that is conveyed by the feeding conveyor, a dividing and separating apparatus located downstream of the alignment apparatus to divide the sheet of the food dough in the feeding direction, weighing conveyors to measure the weight of parts of the sheets that are divided from the sheet and that are put on the weighing conveyors as the sheets are being conveyed, and cutting apparatuses for cutting the sheets of the food dough when the measurements of the weighing conveyors correspond to a preset value.

The dividing and separating apparatus divides the sheet of the food dough into two or more sheets in the feeding direction.

The weighing conveyors, which are arranged in parallel, can be made to approach or retract from each other.

According to the third concept of this invention, a method for supplying food dough is provided. It includes the steps of forming a block of food dough into a sheet that has a given width and thickness, supplying the sheet of the food dough to first and second weighing conveyors located serially along the feeding direction for measuring the weight of a part of the sheet, measuring the weight of a part of the sheet with the first and second weighing conveyors, and cutting the part of the sheet when the sum of the measurements of the first and second weighing conveyors or the measurement of the second weighing conveyor correspond to a preset value, with a cutting apparatus located upstream of the first and second weighing conveyors.

According to the fourth concept of this invention, a method for supplying food dough is provided. It includes the steps of forming a block of food dough into a sheet that has a given width and thickness, supplying the sheet of the food dough to a plurality of first weighing conveyors arranged in parallel, and cutting a part of the sheet when the sum of the measurements of the first weighing conveyors correspond to a preset value, or when the sheet is supplied to second weighing conveyors arranged in parallel and the sum of the measurements of the first and second weighing conveyors correspond to the preset value or the sum of the measurements of the second weighing conveyors correspond to the preset value.

BRIEF EXPLANATIONS OF DRAWINGS

PREFERRED EMBODIMENT OF THIS INVENTION

Figure 1:
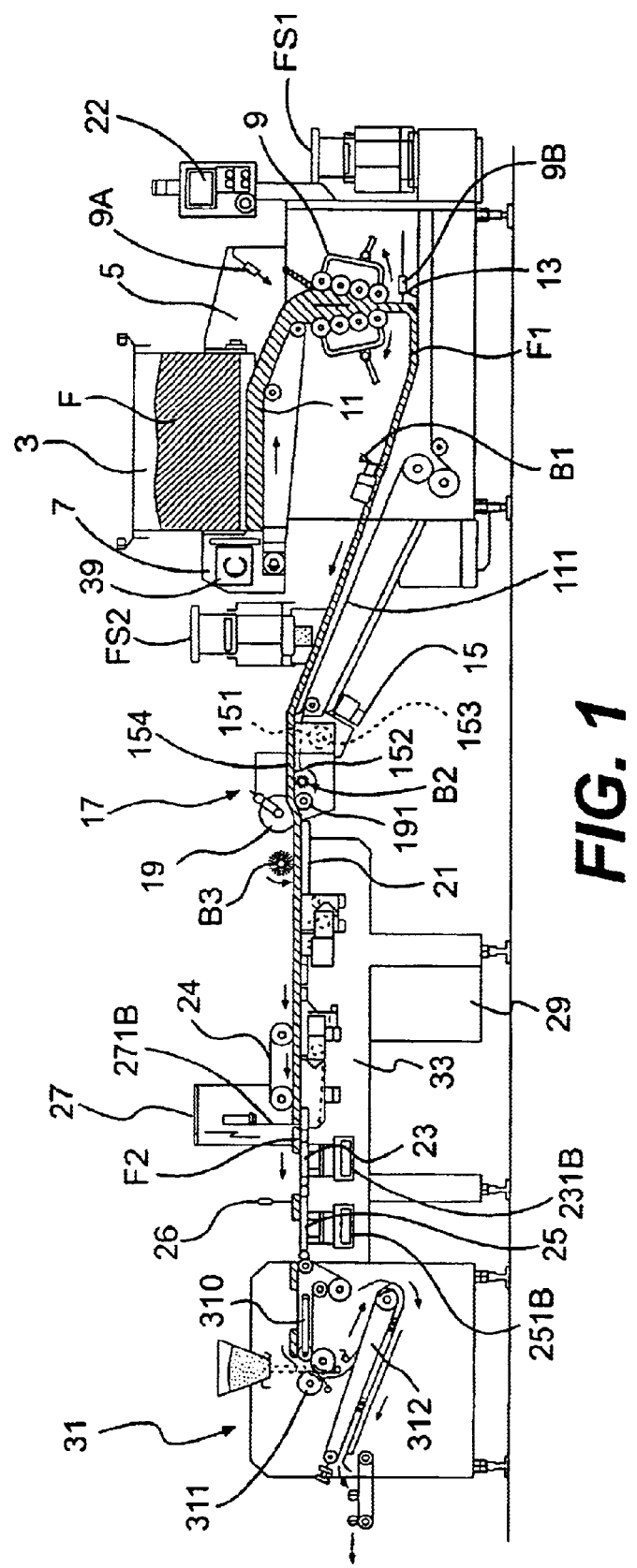
FIG. 1 is a side view of an apparatus for supplying food dough of this invention.

First, based on FIG. 1 an embodiment of an apparatus for supplying food dough of this invention is now explained.

FIG. 1 is a plan view of the apparatus 1 for supplying food dough. The apparatus 1 includes a hopper 3, a dough-supplying section that has a cutting apparatus 7 and a transferring conveyor 11, a dough feeder 9, an alignment apparatus 15, a dividing and separating apparatus 17, a cutting apparatus 27, weighing sections 23 and 25, and a molder 31.

The dough-supplying part has a frame 5. A hopper 3 that receives a large block of food dough F, such as bread dough, etc., is fixed to the frame 5 at the upper part of it. Also, on the frame 5, the cutting apparatus 7 is located along the lower opening of the hopper to cut and divide the block of the food dough F into pieces that have a given volume. Below the cutting apparatus 7 the transferring conveyor 11 is located to convey the pieces of the food dough that are cut by the cutting apparatus 7.

The dough feeder 9 has a plurality of rollers that are arranged like a V. Below them the transferring conveyor 13 is located to feed a sheet of food dough F. It is made by the dough feeder 9 so that it has a constant thickness.

At the downstream end of the feeding path of the transferring conveyor 13, the alignment apparatus 15 is located to sense the center of the width of the part of the sheet of the food dough F that is fed by the transferring conveyor 13, and to align the center with a given point.

The dividing and separating apparatus 17 is located to divide the sheet of the food dough F1 at the downstream end of the alignment apparatus 15. The apparatus 17 has a disk-like cutter 19. It cuts the sheet of the food dough F1 along the centerline of it in the feeding direction of the conveyor 13, after the sheet is centered. Also, at the downstream end of the cutter 19, a separating conveyor 21 is located to separate the narrow sheets of the food dough F1 that are divided by the cutter 19.

Downstream of the transferring path of the separating conveyor 21 a weighing section is located. It includes adjacent first and second weighing conveyors 23 and 25. The weighing conveyors 23, 25 weigh parts of the sheets of the food dough F1 thereon, as the separating conveyor 21 is feeding them. A cutting apparatus 27 is located above the position between the separating conveyor 21 and the first weighing conveyor 23. The cutting apparatus 27 has cutting blades and operates to cut one or both of the sheets of the food dough F1, when the weights of the parts of the sheets of the food dough F1 that are measured by the weighing conveyors 23, 25 reach a predetermined value.

A belt 24 is located above and downstream of the separating conveyor 21. The separating conveyor is located upstream of the cutting apparatus 27. The belt 24 presses the sheets of the food dough F1 to the surface of the separating conveyor 21, so that the bottom surfaces of the sheets become flat. Thus, the bottom surfaces of the sheets of the food dough F1 can evenly contact the surfaces of the first and second weighing conveyors 23, 25, so that precise weighing operations of the conveyors can be performed.

A molder 31 is located downstream of the cutting apparatus 27 to form pieces of the sheets of the food dough F1 that are cut into predetermined forms.

Again, as in FIG. 1, a flour-supplying apparatus FS1 is located upstream of the feeding path of the feeding conveyor 13. It supplies flour on the conveyor belt to prevent the food dough F1 from adhering to the conveyor belt. On the sides of the conveyor 13 brushes B1, B1' are located to supply flour on the sheet of the food dough F1. As is clearly shown in FIG. 5, the brushes B1, B1' are rotated to dust flour on the sides of the sheet. As in FIG. 1, a flour-supplying apparatus FS2 is located downstream of the feeding path of the feeding conveyor 13 so as to supply flour onto the surface of the sheet of the food dough F1. A brush B2 is located under the downstream end of the feeding conveyor where the dividing and separating apparatus 17 is located, so as to remove flour that is supplied by the flour-supplying apparatus FS1 from the lower surface of the sheet of the food dough F1. A brush B3 is located downstream of the dividing and separating apparatus 17 so as to remove flour that is supplied by the flour-supplying apparatus FS2 from the upper surface of the sheet of the food dough F1.

A controller 29, such as a computer, is located to control all of the operations of the system.

Below the operation of the system for supplying food dough is explained. When a large block of food dough F is supplied to the hopper 3, the block in the hopper 3 flows down to the cutting apparatus 7 from the lower opening of the hopper 3. Then, the block is cut into pieces, each of which has a certain length and drops on the transferring conveyor 11. The transferring conveyor 11 feeds each piece of the food dough to the dough feeder 9. When the pieces exit the dough feeder 9, they have been formed into a sheet of food dough F1 that has a uniform thickness.

Then, the sheet of the food dough F1 is fed by the feeding conveyor 13 to the alignment apparatus 15, where the center of the width of the sheet of the food dough F1 is aligned with a given point. The sheet of the food dough F1 is divided by the dividing and separating apparatus 17 at the center along its length and fed to the first weighing conveyor 23. However, if the sheet of the food dough does not need to be divided, neither the dividing and separating apparatus 17 nor the alignment apparatus 15 are necessary. In that case they may not need to be provided or they may be set not to operate.

The first weighing conveyor 23 continuously measures the weight of a part of the sheet of the food dough F1 that is put on it as it is being fed. When the measurement reaches a predetermined value, the cutting apparatus 27 operates to cut the sheet of the food dough F1, so that a chunk of the food dough F2 is made. Then, it is fed to the second weighing conveyor 25, where its weight is again measured.

When the second weighing conveyor 25 again measures the weight of the chunk, if the measurement falls in the allowable range, then the measuring operation by the first weighing conveyor 23 and the cutting operation by the cutting apparatus 27 continue. Thus, the cutting apparatus 27 continuously cuts the sheet of the food dough F1 to form chunks of the food dough F2. They are fed to be processed by a following step. When the second weighing conveyor 25 again measures the weight of the chunk, if the measurement does not fall in the allowable range and is less than the predetermined value, then the timing of the cutting operation of the cutting apparatus 27 is delayed, under a feed-back control. Contrarily, if the measurement is greater than the predetermined value, that timing is expedited. Thus, chunks of the food dough F2 can have a weight within a predetermined range and can be fed to the molder 31.

As discussed below, both the first and second weighing conveyors 23, 25 may be simultaneously operated to measure a part of the sheet of the food dough F1, instead of the case in which the first weighing conveyor 23 measures the weight of a part of the food dough F1 and then the second weighing conveyor 25 again measures the weight. In that case, if the sum of the measurements of the first and second weighing conveyors reaches a preset value, the cutting apparatus 27 is operated to cut the sheet of the food dough F1, so that the chunk of the food dough F2 may be made. This arrangement is appropriate for the case wherein a chunk of food dough F2 that is to be made is too large for the first weighing conveyor 23 to measure.

At the inlet of the molder 31 the chunk of the food dough F2 is extended by a pair of rollers 311 to form a thin sheet of the food dough. Then, a rolling apparatus 312 rolls it up to make an elongated bar-like piece of food dough. It is then fed to a following apparatus.

Next, each operating step is detailed.

Figure 2:
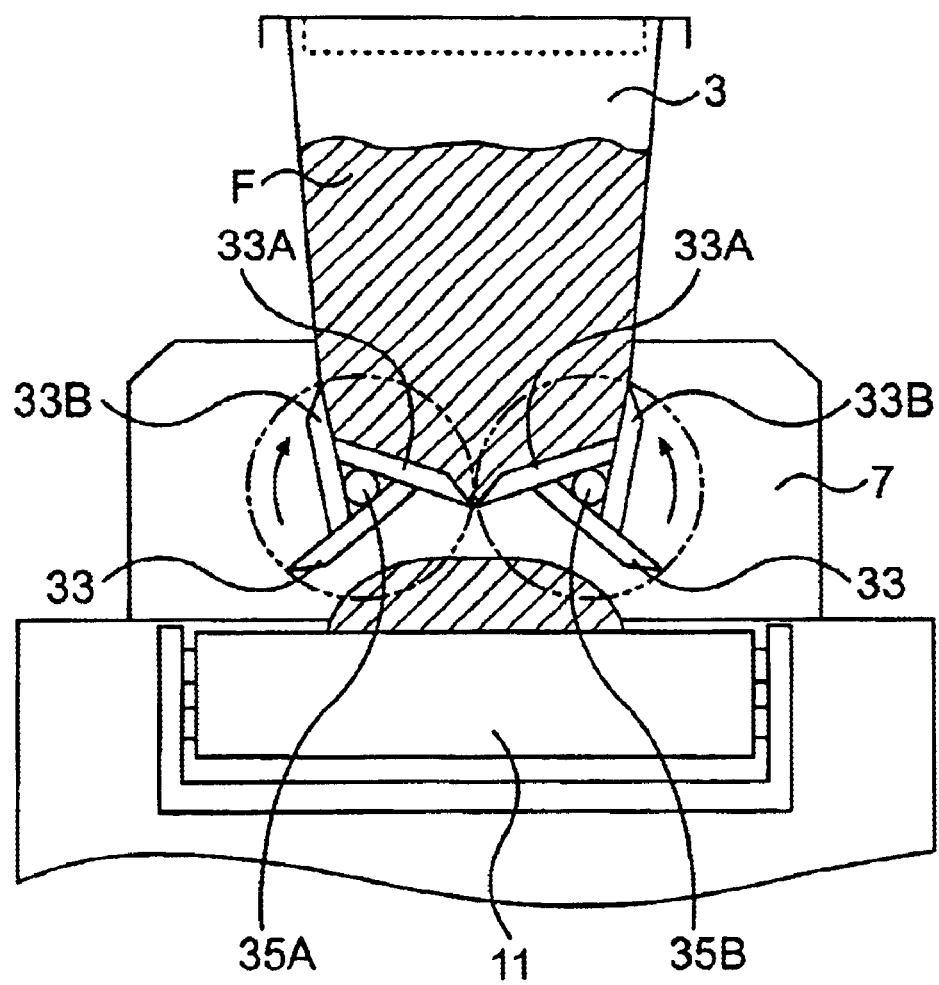
FIG. 2 is a sectional view of a part of the supplying section having a hopper, a cutting apparatus, and a transferring conveyor, along the line I—I in FIG. 3.

FIG. 2 is a sectional and side view of the dough-supplying apparatus. It includes the hopper 3, the cutting apparatus 7, and the transferring conveyor 11. The cutting apparatus 7 is used to cut at every preset distance the food dough F that falls from the lower opening of the hopper 3, so that pieces of food dough that have constant weights can be divided from the block of the food dough F. The cutting apparatus 27 has a pair of parallel rotating shafts 35A and 35B near the opening along its length. A plurality of blades 33 are fixed on each shaft.

In the cutting apparatus 7, when a controller 22 (FIG. 1), such as a computer, supplies a command to a driving motor 39 (FIG. 3) to drive it, the driving motor 39 operates to inwardly rotate the rotating shafts 35A and 35B. A dog 43 is provided at one end of one of the shafts. It simultaneously rotates as the shafts having the blades are rotated. Also, a sensor 45 is located at a position where it can oppose the dog 43. When the sensor 45 senses the dog 43, it generates a signal to stop the rotation of the driving motor 39. As in FIG. 2, when the pair of the blades 33A rotate so that their ends move down and away from each other, and then the following pair of blades 33B approach each other, then the sensor 45 senses the dog 43 and stops rotating the driving motor 39. Thus, the cutting apparatus can divide blocks of the food dough F so that they have the same volume. The volume is determined by the given rotational angle of one of the blades, i.e., the pitch between the pair of the blades 33A, 33A and the pair of the blades 33B, 33B, which are fixed on the rotating shafts 35A, 35B. Then, the blocks of the food dough F, which were divided by the cutting apparatus, are fed by the transferring conveyor 11 in the direction designated by the T as in FIG. 3 to the dough feeder. 9.

Figure 3:
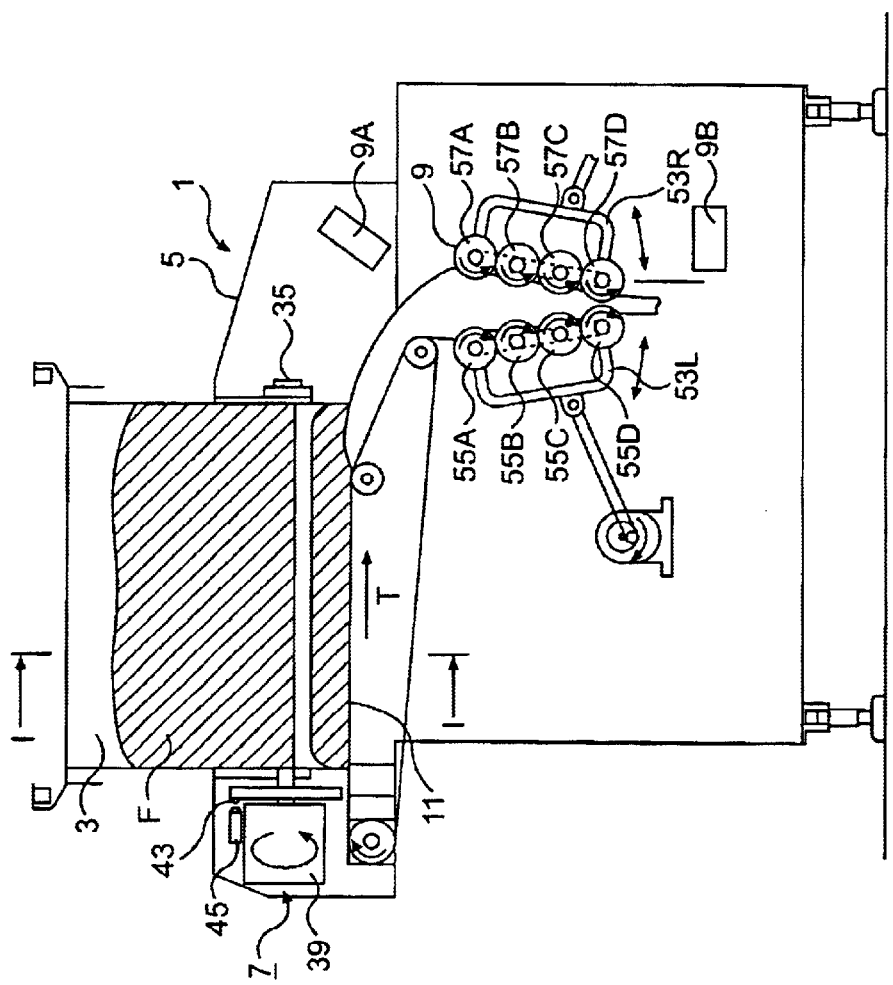
FIG. 3 is a sectional and front view of the food-supplying section and the dough feeder part.

FIG. 3 is a schematic and front sectional view of the dough-supplying section and the dough feeder 9. The dough feeder 9 has a roller-supporting member 53R at the right in FIG. 3 and a roller-supporting member 53L at the left in FIG. 3. The roller-supporting member 53R is supported by a frame, while the roller-supporting member 53L is connected to the motor. The roller-supporting members 53R and 53L have a group of rollers 55A, 55B, 55C, and 55D and a group of rollers 57A, 57B, 57C, and 57D, respectively. The groups of the rollers are arranged like a "V." No explanation on this dough feeder is given, as it is substantially the same as a prior-art apparatus.

A photo sensor 9A is located near the input port of the dough feeder 9. It monitors the rate at which the food dough is supplied from the transferring conveyor 11 to the input port so as to keep that rate constant. That is, the block of the food dough is supplied to the input port of the dough feeder 9. The photo sensor 9A senses the level of the head of the block and controls the speed of the transferring conveyor 11 so that the head may always be kept at a given level.

A photo sensor 9B is located near the output port of the dough feeder 9. It monitors the distance to a position on the sheet of the food dough F1, and controls the rate of the supply of the dough feeder 19, so that the sheet of the food dough F1 can be prevented from being loose and extremely stretched when it is put on the feeding conveyor 13.

Figure 6:
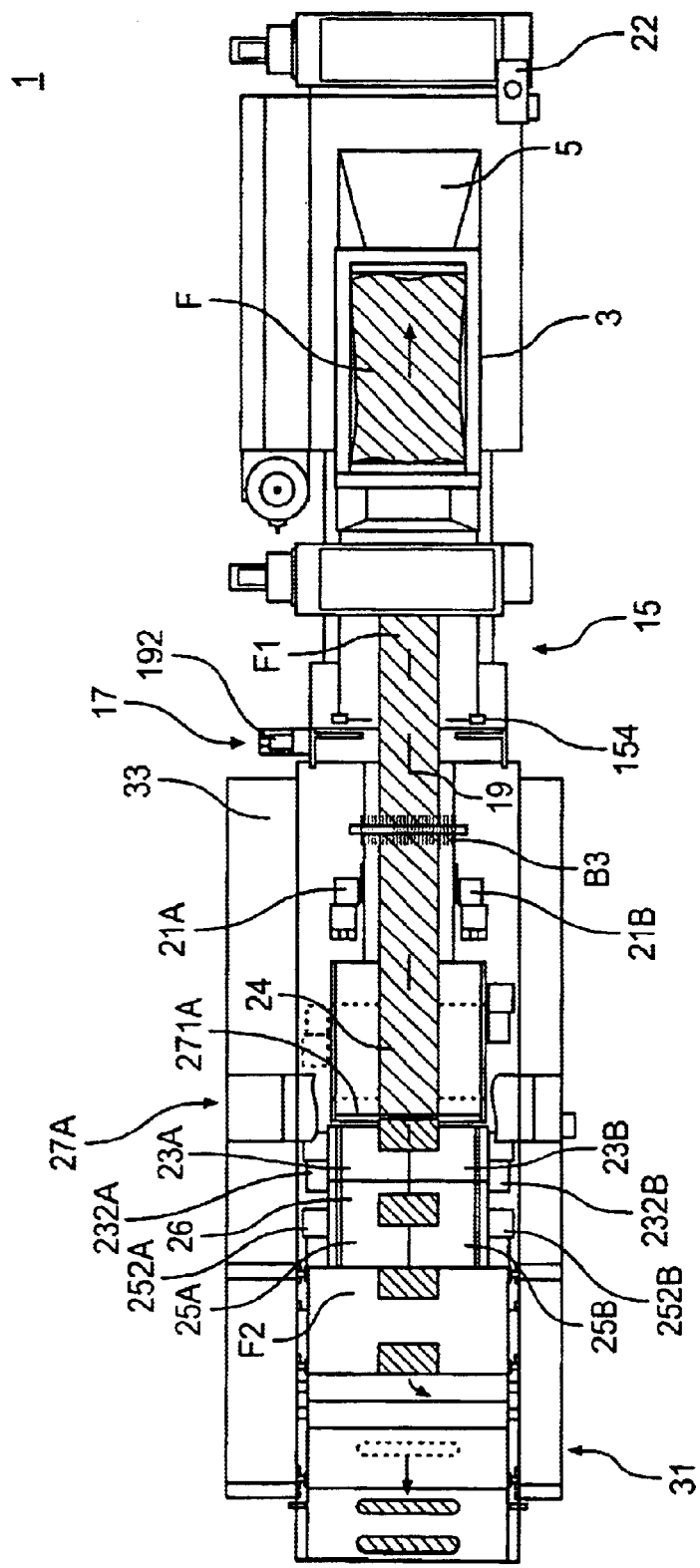
FIG. 6 is a schematic, perspective view of the first embodiment of the apparatus for supplying food dough of this invention. The embodiment is modified.

Again based on FIG. 1, the alignment apparatus of the sheet of the food dough F1 (to center it) is explained. It includes a sliding arm 151. It can move perpendicularly to the feeding direction of the belt 111 of the feeding conveyor 13 (or along the width of the belt). The sliding arm 151 supports a roller 152. The roller 152 supports the belt 111. When a driving member 153, such as a ball screw, moves the sliding arm 151, the belt 111 can be moved horizontally right or left by the roller 152. Also, sensors 154 (FIG. 6) are located near the sides of the feeding conveyor 13 to sense the width of the sheet of the food dough F1. Each sensor senses a distance to the side of the sheet. Based on the measurements of the sensors, the center position of the sheet is calculated.

The center position that is calculated is compared with a preset value. If there is a difference between the calculated center position and the preset value, a correcting value is sent to the driving member 153 of the alignment apparatus 15, so that the sliding arm 151 can be moved left or right to align the center position of the sheet of the food dough F1 with the preset position.

In the embodiment discussed above, the alignment apparatus 15 is located downstream of the feeding conveyor. However, it may be located upstream of the dividing and separating apparatus 17.

Figure 4:
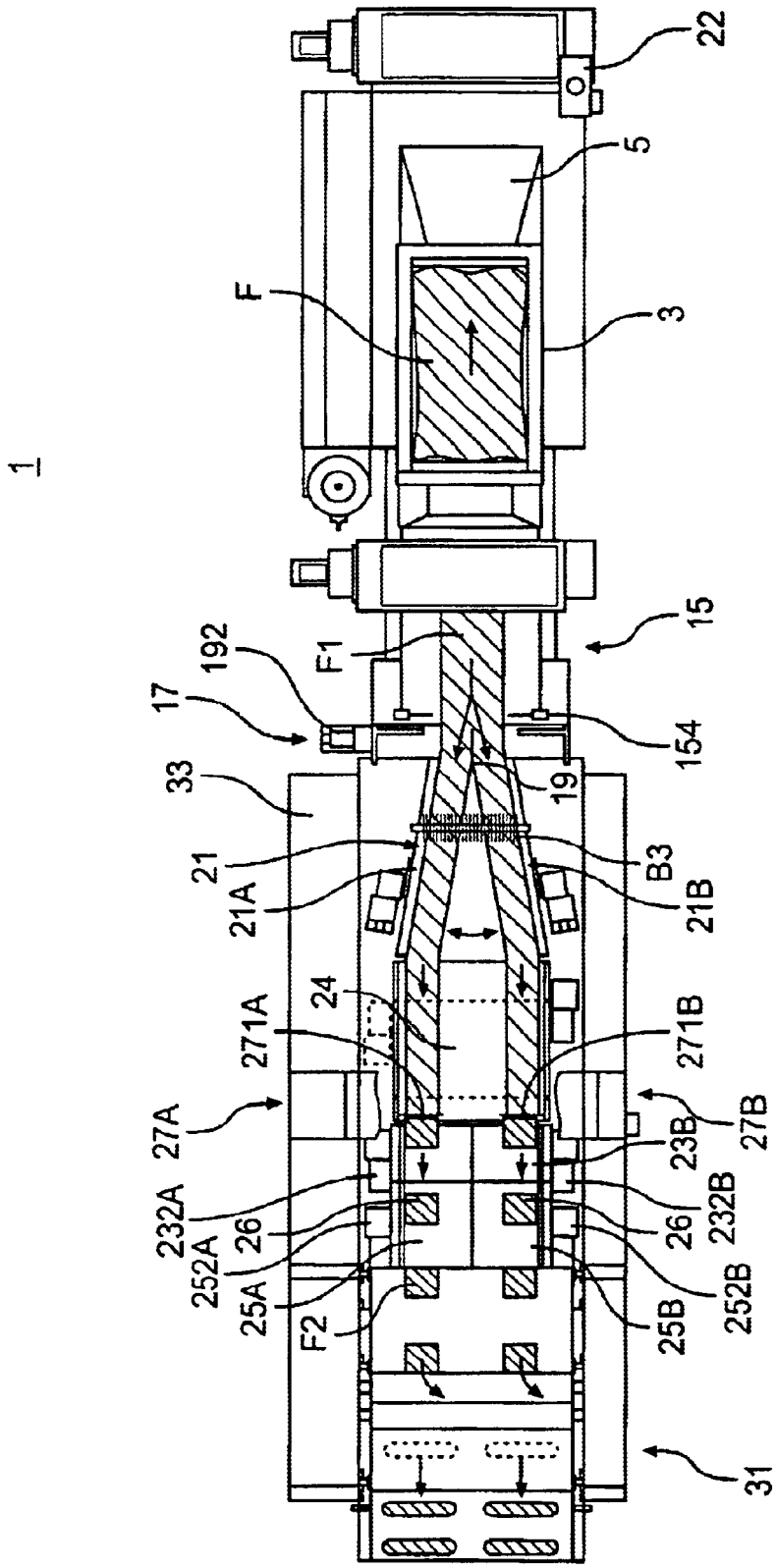
FIG. 4 is a plan view of a first embodiment of the apparatus for supplying food dough of this invention.
Figure 5:
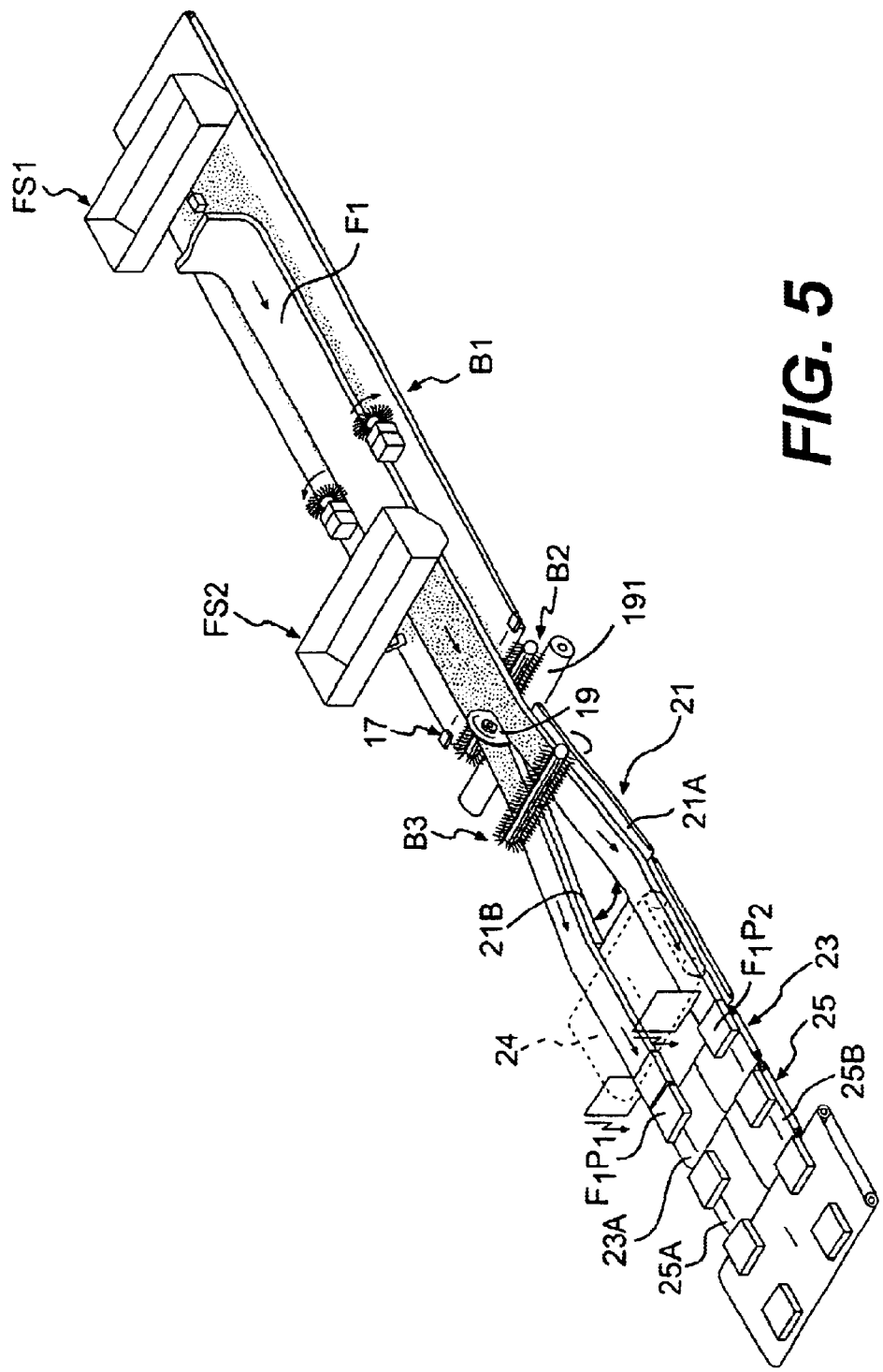
FIG. 5 is a schematic, perspective view of the first embodiment of the apparatus for supplying food dough of this invention.

Next, based on FIGS. 1, 4, and 5, the dividing and separating apparatus 17 is now explained. It is positioned downstream of the alignment apparatus 15. It includes a cutter 19 that cuts the sheet of the food dough F1 in the feeding direction, a cutter roller 191 that contacts the cutting edge of the cutter 19, and a driving motor 192 (FIG. 4) that rotates the cutter roller 191. Slits are formed on the cutter 19, so that the area of the contact of the cutter with the food dough can decrease when the cutter cuts the sheet. Also, the sheet of the food dough can be prevented from adhering to the cutter 19.

The separating conveyor 21 is located downstream of the cutter 19. It has narrow branch conveyors 21A, 21B to separate the sheet that is divided by the cutter 19. However, as in FIGS. 9 and 10, the narrow branch conveyors 21A, 21B may be positioned so that there is no gap between them. Also, guide plates 37a, 37B may be located downstream of the cutter 19, so that the divided sheets F1D1, F1D2 can be separated by a preset distance between them.

Rather than two sheets, the food dough F1 may be divided into three or more sheets. In that case a given number of the cutters 19 are located at certain positions. The divided sheets may have the same or several different widths.

In the embodiment as in FIGS. 4 and 5, the sheet of the food dough F1 is divided into two sheets. Then, they are separately fed by the separating conveyor 21. However, as in FIG. 6, the cutter 19 may not need to be operated, so that the sheet is not divided. In that case the guide plates 37A, 37B are not used. Also, in that case the branch conveyors of the separating conveyor 21 are kept together. Instead of the separating conveyor 21 a single wide conveyor may be used.

As in FIGS. 1, 4, and 5, the first and second weighing conveyors 23, 25 of the weighing section are located downstream of the separating conveyor 21. During the transfer of the parts, the weighing conveyors continuously measure the weights of the parts of the sheets of the food dough F1 that are fed from the separating conveyor 21. If the bottom surfaces of the parts are not flat, they cannot evenly contact the first and second weighing conveyors 23, 25 during the measurements of the parts. As a result, they cannot evenly share the weights of the parts, so that the weighing conveyors cannot precisely measure the weight. Thus, a belt 24 is located above the separating conveyor 21, which is positioned upstream of the first weighing conveyor 23, to press the sheets of the food dough on the conveyor 23. The, belt presses the sheets of the food dough F1 on the separating conveyor 21 with an even force. Thus, the bottom surfaces of the sheets of the food dough F1 can be flat. Thus, the bottom surfaces can evenly contact the feeding surface of the first weighing conveyor 23 as the sheets are fed by it. Also, the weights of the sheets of the food dough F1 can be evenly shared by the feeding surface.

The first and second weighing conveyors 23, 25 are supported by a frame 33 and have first and second weighing conveyor sections 23A, 23B and 25A, 25B, respectively. These conveyor sections are serially connected to each other downstream of the branch conveyors 21A, 21B. They measure the weights of the pieces of the food dough that are fed from the branch conveyors 21A, 21B. First and second weighing bases 231A, 231B and 251A, 251B are located under the first and second weighing conveyor sections. 23A, 23B and 25A, 25B (FIG. 1), respectively (but, the weighing bases 231A and 251A are not shown). These weighing bases are fixed on the frame 33. Conveyor belts are carried on the weighing bases. Driving motors 232A and 232B are connected to the first and second weighing conveyor sections 23A, 23B and 25A, 25B, respectively.

The cutting apparatuses 27A, 27B are located near the upstream ends of the first weighing conveyor sections 23A, 23B. The cutting apparatuses 27A, 27B have blades 271A, 271B. Slits may be formed on them to prevent the food dough F1 from adhering.

The controller 29 controls the driving motors for the first and second weighing conveyor sections and the cutting apparatuses 27A, 27B. That is, when the sheets of the food dough, are fed from the branch conveyors 21A, 21B to the first weighing conveyor sections 23A, 23B, if the measurement corresponds to the preset value, then the cutting apparatuses 27A, 27B operate to lower the blades 271A, 271B to cut the food dough F1. The chunks of the food dough F2 that are cut by the blades are fed from the first weighing conveyor sections 23A, 23B to the second weighing conveyor sections 25A, 25B where their weights are again measured. If those measurements differ from the preset value, a signal denoting this is fed back, so that the timing of the cutting operations of the cutting apparatuses 27A, 27B is accelerated or decelerated according to these results. Thus, the precision of the measurements can be increased.

The rates of the feeding of the first and second weighing conveyor sections 23A, 23B are faster than those of the separating conveyors. Also, the rates of the feeding of the second weighing conveyor sections 25A, 25B are faster than those of the first weighing conveyor sections 23A, 23B. The rates are so controlled, because adjacent chunks of the food dough F2 that are arranged back to front are separated from each other, so that the gap between them is extended.

Figure 7:
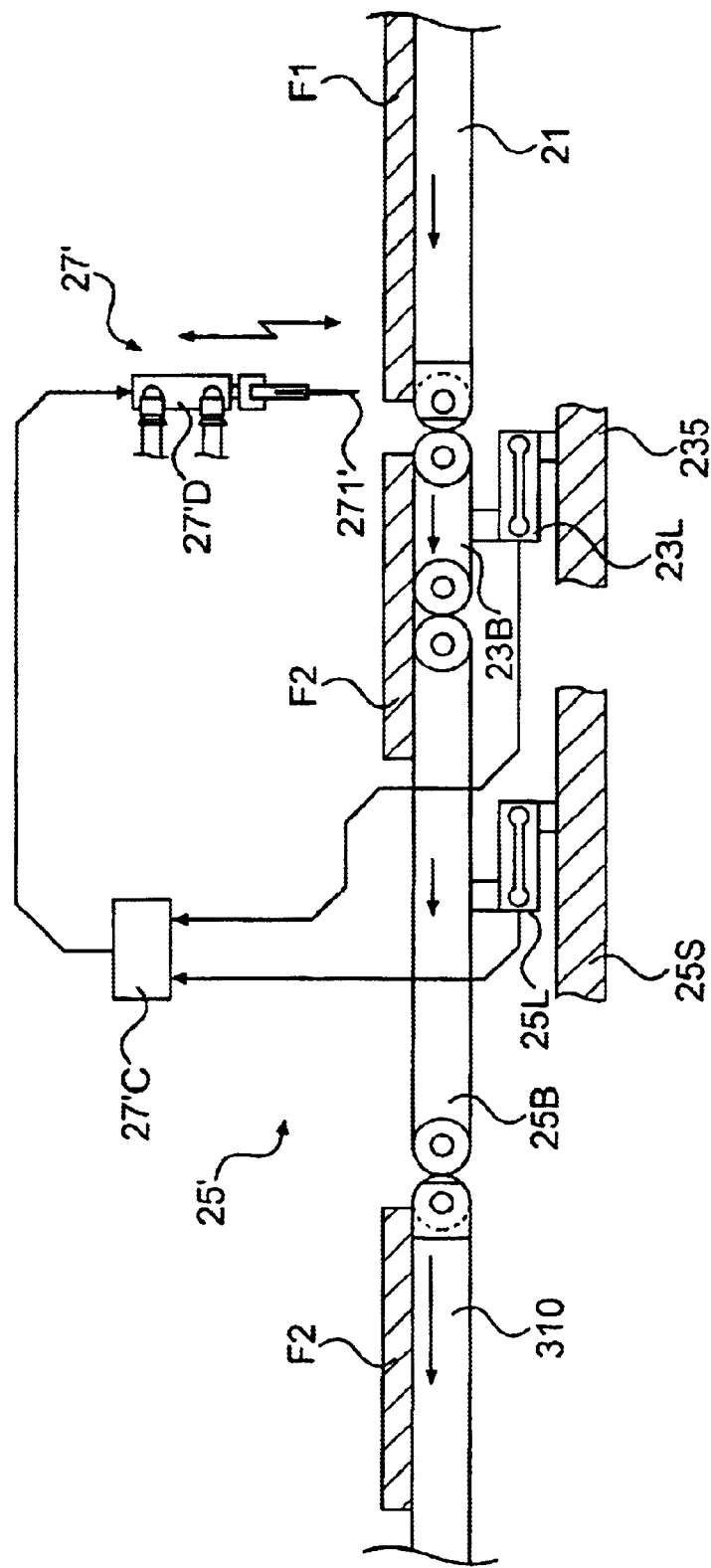
FIG. 7 is a schematic, side view of the food-cutting apparatus of the apparatus for supplying food dough of this invention and the first and second weighing conveyors of the second embodiment of this invention.
Figure 8:
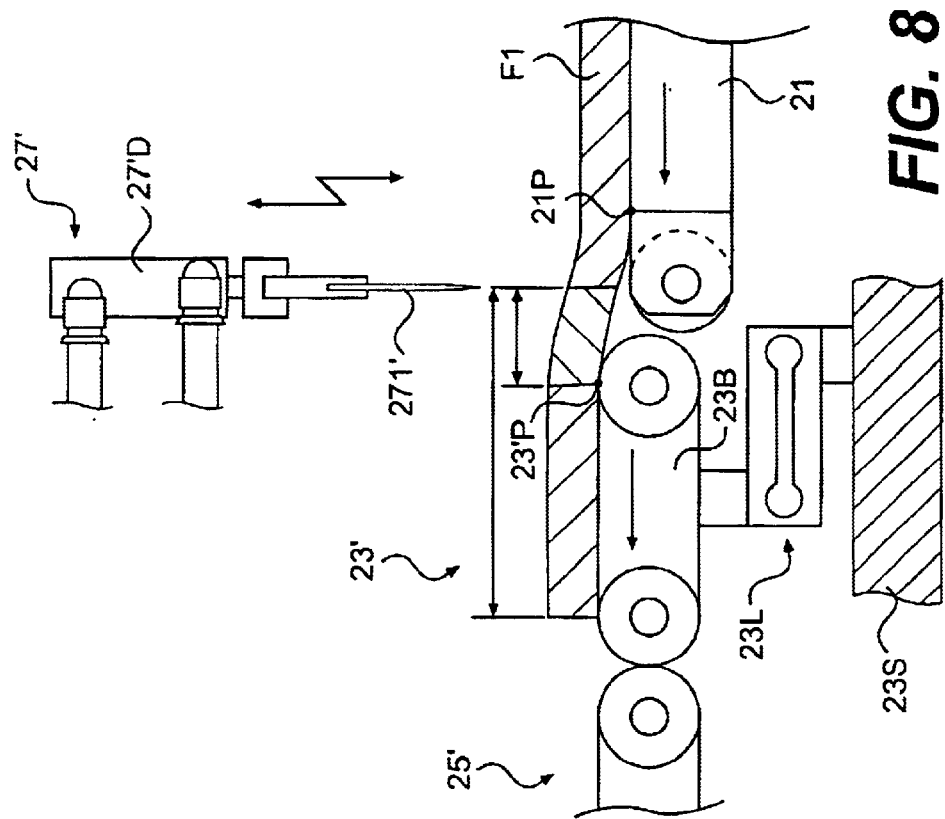
FIG. 8 is an expanded and schematic side view of the food-cutting apparatus of the apparatus for supplying food dough of this invention and the first weighing conveyor shown in FIG. 7.

Based on FIGS. 7 and 8 a cutting apparatus 27' and first and second weighing conveyors 23', 25' are now explained. The first weighing conveyor 23' is provided with a sheet of food dough, such as bread dough. It is supplied by the separating conveyor 21, after it is formed by a dough-extending apparatus or a dough-sheet forming apparatus that is located upstream of the first weighing conveyor. The second weighing conveyor 25' is located downstream of and adjacent to the first weighing conveyor 23'. Downstream of the second weighing conveyor 25' a feeding conveyor 310 is located to convey the food dough F2 to the following apparatus, such as the molder 31 (FIG. 1). Also, at the end of the separating conveyor 21 the cutting apparatus 27' is located to cut the food dough F1. As in the first embodiment, discussed above, the first and second weighing conveyors 23' and 25' continuously measure a part of the food dough F1 as they are conveying them. Also, the cutting apparatus 27' cuts that part of the food dough F1 based on the results of the measurements.

Conventional apparatuses may be used for both the dough-extending apparatus to form food dough into a sheet or strip and for the sheet-forming apparatus. The dough-extending apparatus of the first embodiment may be used for this second embodiment. Also, instead of the separating conveyor 21, a common feeding conveyor may be used to transfer the sheet of the food dough that is formed by the sheet-forming apparatus. No explanation of the feeding conveyor 310 is given herein, as it is a prior-art apparatus.

The first weighing conveyor 23' measures the weight of a part of the food dough F1 that is transferred by the separating conveyor 21. As in FIG. 8, the first weighing conveyor 23' is positioned at a level that is slightly higher than the level of the separating conveyor 21. The difference between the levels is so little that the leading edge of the sheet of the food dough F1 can easily move up and onto the first weighing conveyor 23' from the separating conveyor 21 according to the distance the belt of the first weighing conveyor 23' moves, after the leading edge contacts the feeding-in end of the first weighing conveyor 23'. Also, as in FIGS. 7 and 8, the first weighing conveyor 23' is supported on a base 23S by a load cell 23L.

The second weighing conveyor 25' measures the part of the food dough F2 that is cut by the first weighing conveyor 23' after it is cut by the cutting apparatus 27'. Similarly to the first weighing conveyor 23', the second weighing conveyor 25' is supported on a base 25S by a load cell 25L. The level of the second weighing conveyor 25' is the same as that of the first weighing conveyor 23'. The second weighing conveyor 25' is longer than the first weighing conveyor 23', so that the second weighing conveyor 25' can hold the entire part of the food dough F2 that is cut out.

The load cells 23L and 25L of the first and second weighing conveyors 23' and 25' are connected to a controller 29, such as a computer, to which signals indicative of measurements of the load cells are input.

The cutting apparatus 27' has a cutting blade 271'. It is moved up and down by a driving apparatus 27D', such as an air cylinder, to cut the food dough F1 near the connection between the separating conveyor 21 and the first weighing conveyor 23'. In detail, as in FIG. 8, the cutting apparatus 27' is located upstream of the first weighing conveyor 23', so that it can cut the sheet of the food dough F1 between the point 21P where the sheet of the food dough F1 starts to be taken off the separating conveyor 21 and the point 23'P where the sheet starts to be put on the first weighing conveyor 23'.

The controller 29 may control all the operations of the separating conveyor 21, the first and second weighing conveyors 23', 25', the cutting apparatus 27', etc.

During the operation, the separating conveyor 21 and the first and second weighing conveyors 23', 25' are controlled to move at the same speed. Then, they transfer the sheet of the food dough F1 from the separating conveyor 21 to the first weighing conveyor 23'. When the sheet of the food dough F1 is fed by the first weighing conveyor 23', the weight of the part of the food dough F1 that is put on the first weighing conveyor 23' is continuously measured by the load cell. The measurements are compared with the preset value at a comparing section. When a measurement by the load cell corresponds to the preset value, the cutting apparatus 27' operates to cut the sheet of the food dough F1 with the cutting blade 271'. If the chunk F2 is small, its cutting operation is controlled to be relatively fast.

When the chunk F2 is divided from the sheet of the food dough F1, the first and second weighing conveyors 23', 25' are driven so that their speeds may increase. Then, the chunk F2 is transferred to the second weighing conveyor 25'. When a sensor (not shown) senses the fact that the tail end of the chunk F2 has passed the downstream end of the first weighing conveyor 23', i.e., when the chunk F2 has been transferred to the second weighing conveyor 25', then the first and second weighing conveyors 23', 25' are controlled so that their speeds may be returned to the normal speeds or may equal the speed of the separating conveyor 21. The first weighing conveyor 23' is controlled so that the leading end of the following sheet of the food dough F1 moves up and onto the first weighing conveyor 23', just after the speed of the first weighing conveyor is returned from the higher speed to the normal speed. Thus, no difference between the speeds of the separating conveyor 21 and the first weighing conveyor 23' is generated, so that the sheet of the food dough F1 is not extended.

Then, the load cell 25L of the second weighing conveyor 25' measures the weight of the chunk F2. The measurement is compared with a preset value at the comparing section of the controller 29. If they correspond, the controller determines if the cutting position of the cutting apparatus 27' is correct. If the measurement is larger or smaller than the preset value, the controller determines if that position of the cutting apparatus 27' is wrong. Then, the cutting apparatus 27' is controlled to shift the timing of its cutting operation.

That is, if the measurement is greater than the preset value, it is determined that the weight of the chunk F2 is large, and that thus the timing of the cutting operation of the cutting apparatus 27' is slow. In that case, suitable parameters are used to modify the preset value to expedite the timing of the cutting operation. In contrast, if the measurement is less than the preset value, it is determined that the weight of the chunk F2 is small. In that case, the preset value is modified to be large. Then, the modified preset value ("modification") is compared with the measurement. Based on it the cutting operation is carried out. Thus, the weight of a chunk 3A can correspond to the modified value. A modification may be automatically calculated by previously obtaining a table of data or an empirical equation on the relationship between the parameters and the difference between measurements and the preset value, by retrieving a suitable parameter from the table of data etc. and by modifying the preset value to the modified value. Thus, the automation of this modification is easy.

When a relatively large chunk of the food dough is formed from the sheet of the food dough, the relatively large chunk moves up and onto the first and second weighing conveyors 23' and 25'. In that case, the second weighing conveyor 25' functions as a weighing conveyor along with the first weighing conveyor 23'. Thus, the measurements of the load cells 23L, 25L of the first and second weighing conveyors 23', 25' are summed, and compared with the preset value at the comparing section of the controller 29. When the sum of the measurements corresponds to the preset value, the sheet of the food dough F1 is cut. Then, the speeds of the first and second weighing conveyors 23', 25' are accelerated. Then, when the entire chunk F2 is moved along the second weighing conveyor 25', it is weighed. As discussed above, if the measurement by the second weighing conveyor 25' does not correspond to the preset value, the preset value is modified.

The leading end of the following sheet of the food dough F1 can move up and onto the first weighing conveyor 23', although a part of the preceding chunk F2 is still on it. In that case, if the first weighing conveyor 23' starts measuring the weight of the following sheet, its measurement can include an error. Thus, it is desired that the following sheet of the food dough F1 move up and onto the first weighing conveyor 23' after the chunk F2 has completely exited the first weighing conveyor 23'. Thus, the cutting position of the cutting apparatus 27' is set at a position in the upstream direction that is far from the inputting end of the first weighing conveyor 23'.

As discussed above, the level of the first weighing conveyor 23' is slightly higher than that of the separating conveyor 21. The distance between the point 21P where the sheet of the food dough F1 starts to be taken off the separating conveyor 21 and the point 23'P where the sheet starts to be put on the first weighing conveyor 23' can be greater than when the levels are the same. Also, the cutting apparatus 27' does not damage the separating conveyor 21 when it cuts the sheet of the food dough F1, although the cutting apparatus 27' is positioned above the end of the separating conveyor 21. Also, because the first weighing conveyor 23' measures a part of the sheet of the food dough F1 that is on it and another part of it is raised so as to be far from the separating conveyor 21, a precise measurement can be performed. Thus, the number of modifications that need to be made to correctly measure the weight of the chunk F2 can decrease. Also, the cutting position of the cutting apparatus 27' can be far from the inputting side of the first weighing conveyor 23'.

The above discussion describes the structure wherein the controller 29 operates the cutting apparatus 27' to cut the sheet of the food dough F1, when the measurement by the first weighing conveyor 23' corresponds to the preset value, or when the sum of the measurements by the first and second weighing conveyors 23', 25' corresponds to the preset value. However, as stated above, when the sheet of the food dough F1 is put over the first and second weighing conveyors 23', 25' to make a large chunk F2, the cutting apparatus 27' can operate to cut the sheet of the food dough F1 when the measurement by the second weighing conveyor 25' corresponds to the preset value. This is because the weight of the part of the food dough F1 that is on the entire first weighing conveyor 23' is constant and can be previously determined.

As discussed above on the embodiment, the chunk F2 is cut when the measurement by the first weighing conveyor 23' corresponds to the preset value, or when the sum of the measurements by the first and second weighing conveyors 23', 25' corresponds to the preset value set by the controller 29. Then, the measurement is compared with another preset value. If necessary, then the cutting apparatus 27' is controlled to adjust the timing of the cutting operation, so that the weight of the chunk F2 can be the optimum. Thus, every chunk F2, which may have a weight within a wide range, can be correctly measured. Also, parts of it can be cut out. That is, both small and relatively large chunks that have correct weights can be cut out. If the predetermined number of chunks F2 that have preset weights are cut and then the preset value is changed in the controller 29, then chunks F2 that have different weights from the preceding chunks F2 can be continuously cut. Thus, this embodiment is useful for the mass-production of chunks that have the same weight or the production of many kinds of little chunks.

Figure 9:
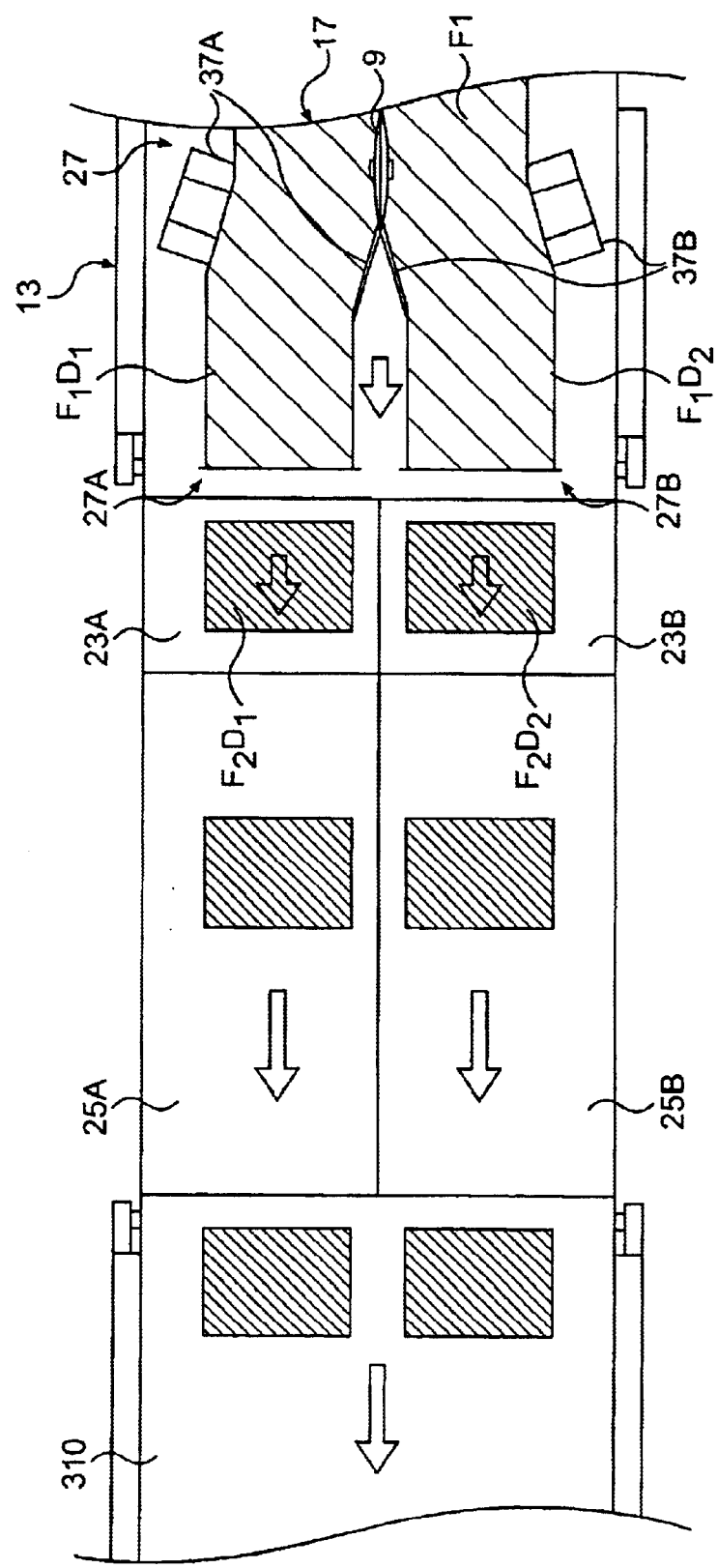
FIG. 9 is a schematic and plan view of the food-cutting apparatus of the apparatus for supplying food dough of this invention and a third embodiment of the first and second weighing conveyors.

FIG. 9 illustrates a third embodiment of the cutting apparatus for food dough and the first and second embodiments. In this embodiment, a dividing and separating apparatus 17 is located on the feeding conveyor 13. It includes a rotating cutter 19 to cut the sheet of the food dough F1 in the feeding direction into a plurality of sheets as the sheet is being fed by the feeding conveyor 13. Also, the dividing and separating apparatus 17 includes guide members 37A, 37B. The sheets F1D1, F1D2 are divided by the rotating cutter 19. The guide members guide them to separate them by a given distance.

The sheet of the food dough F1 is conveyed by the feeding conveyor 13. When the sheet is cut by the rotating cutter 19 into a plurality of sheets F1D1, F1D2, they are guided to be separated by the guide members 37a, 37B by a given distance, and then fed in parallel. The dividing and separating apparatus 17 can be conveniently used. If it is used, it is located on the feeding conveyor 13. If it is not used, it is moved away from the feeding conveyor 13. In this case the sheet of the food dough F1 is not divided.

The dividing and separating apparatus 17 may have its location adjusted to be located on convenient positions along the width of the feeding conveyor 13, so that the sheet can be divided in a desired ratio of the width of one sheet to that of another sheet.

Cutting apparatuses 27A, 27B are located on the feeding paths for the sheets F1D1, F1D2 to cut these sheets. The cutting apparatuses 27A, 27B have short cutting blades. Each apparatus is the same as the cutting apparatus 27, discussed above. Thus, no details on these apparatuses are given.

Weighing conveyor sections 23A, 23B are positioned in parallel to measure the weights of chunks F2D1, F2D2 after they are divided by the cutting apparatuses 27A, 27B. Also, weighing conveyor sections 25A, 25B are arranged in parallel to correspond to the weighing conveyor sections 23A, 23B. Each of the weighing conveyor sections 25A, 25B is the same as the second weighing conveyor 25.

When the sheet of the food dough F1 is cut and divided into the sheets F1D1, F1D2 by the dividing and separating apparatus 17 as the sheet is being fed by the feeding conveyor 13, the sheets F1D1, F1D2 are slightly separated by the guide members 37A, 37B and conveyed. When the sheets F1D1, F1D2 move up and onto the weighing conveyors 23A, 23B, they measure the weights of the parts of them that move up and onto them. When the measurements (or their sensed weights) correspond to the preset values, the cutting apparatuses 27A, 27B are separately operated to divide the sheets F1D1, F1D2. Then, their weights are measured by the weighing conveyor sections 25a, 25B. As discussed for the above embodiments, then it is determined if the weights are appropriate.

Figure 10:
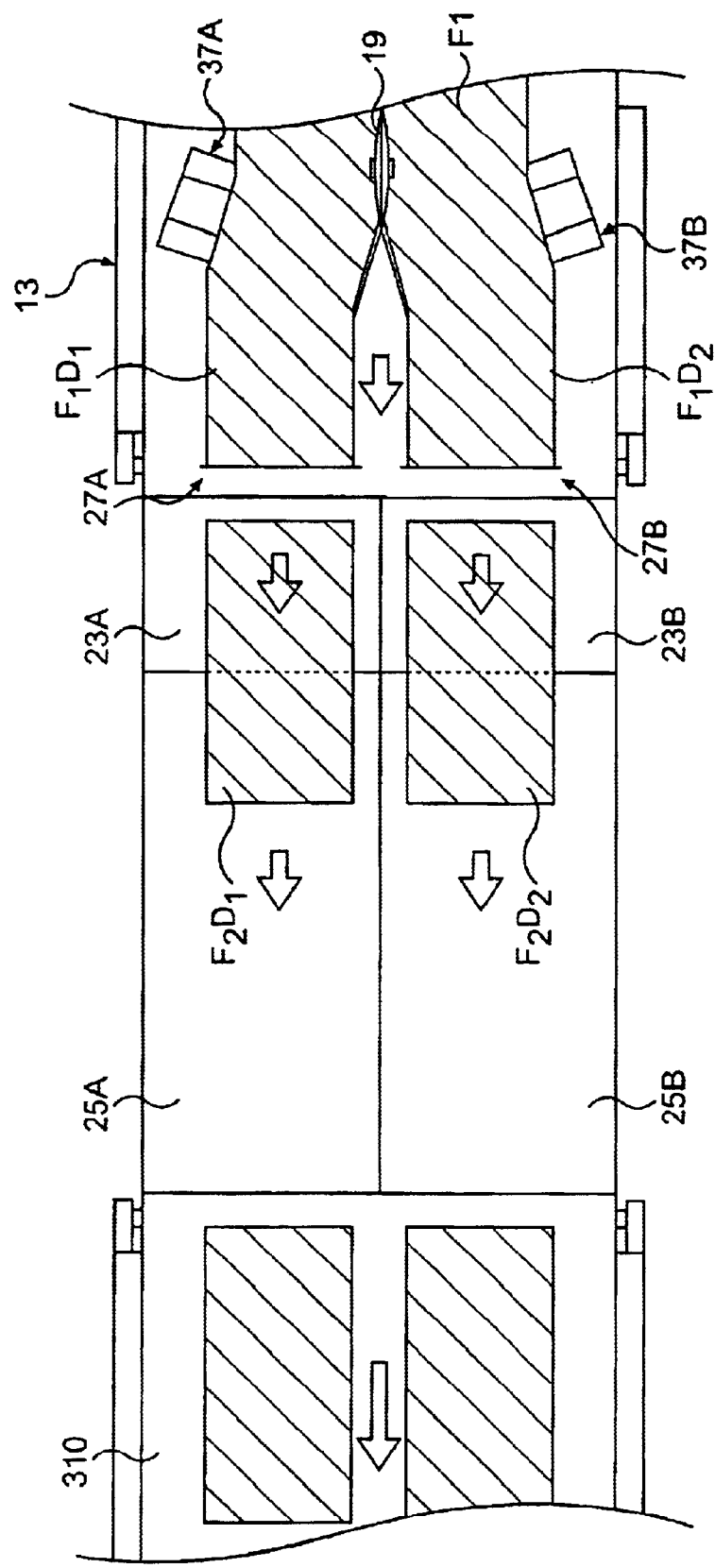
FIG. 10 is a schematic plan view of the food-cutting apparatus of the apparatus for supplying food dough of this invention and a fourth embodiment of the first and second weighing conveyors shown in FIG. 9.

FIG. 10 illustrates a fourth embodiment of the cutting apparatus for food dough and the first and second weighing conveyors. As in this figure, if the sheets F1D1, F1D2 are relatively large, they move up and onto both the weighing conveyor sections 23A, 23B and 25A, 25B. In this case, as stated above, when the sum of the measurements by the weighing conveyor sections 23A, 23B and 25A, 25B corresponds to the preset values, the sheets are cut by the cutting apparatuses 27A, 27B into chunks F2D1, F2D2.

In this embodiment, for the respective lines of the weighing conveyor sections, which are serially arranged, the preset values can be made to differ. Thus, a relatively wide sheet F1 can be divided into a plurality of sectional sheets, and then the sectional sheets can be individually measured and cut. Thus, this embodiment allows many chunks that have the same weights to be made, or chunks that have different weights to be simultaneously made.

Figure 11:
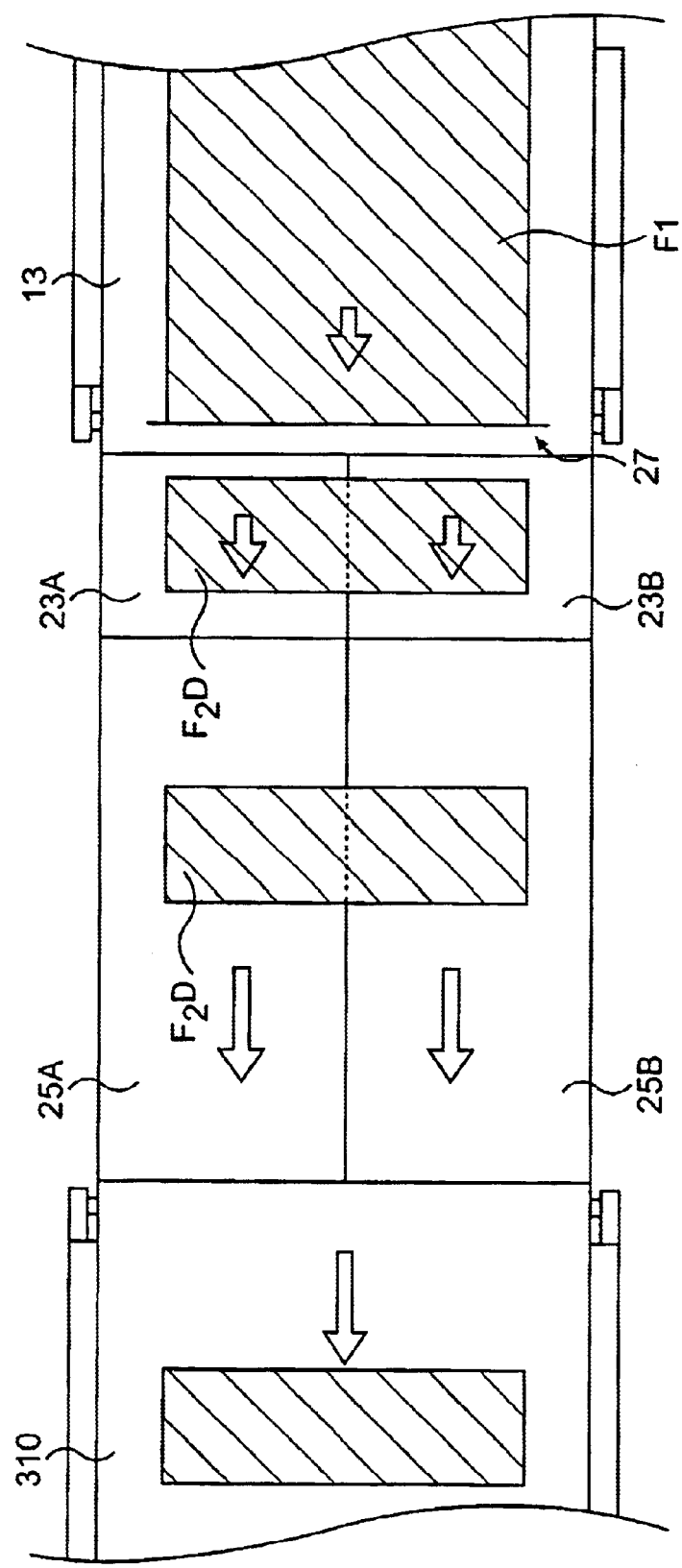
FIG. 11 is a schematic plan view of the food-cutting apparatus of the apparatus for supplying food dough of this invention and a fifth embodiment of the first and second weighing conveyors shown in FIG. 9.

FIG. 11 illustrates a fifth embodiment of the cutting apparatus for food dough and the first and second weighing conveyors. This embodiment uses the first and second conveyor sections 23A, 23B, 25A, and 25B of the first embodiment. But they are modified to have no gap between the conveyor sections, which are arranged in parallel, as for the fourth embodiment. The sheet of the food dough F1 moves up and onto both of the first weighing conveyor sections 23A, 23B. If a chunk F2D is relatively small and if the sum of the measurements by the first weighing conveyor sections 23A, 23B corresponds to the preset value, then the cutting apparatus 27 cuts the chunk F2D. If a chunk F2D is relatively large, and if the sum of the measurements by the first weighing conveyor sections 23A, 23B and the measurements by the second weighing conveyor sections 25A, 25B correspond to the preset value, or if the sum of the measurements by only the second weighing conveyor sections 25A, 25B corresponds to the preset value, then the cutting apparatus 27 cuts the chunk F2D.

When the chunk F2D is transferred to the second weighing conveyor sections 25A, 25B, respective sections measure the weight of it. The measurements are summed. The sum is compared with the preset value. Then, based on this comparison the weight of the chunk F2D is considered as to whether it is appropriate. If necessary, the preset value is modified.

In this embodiment, the plurality of one group of the weighing conveyor sections and the plurality of the other group of the weighing conveyor sections, which group is serially arranged after the first group (the first and second weighing conveyor sections 23A, 23B, 25A, 25B), may be arranged so that there are no gaps between them. This arrangement allows a relatively wide sheet of food dough to be cut and divided into a chunk or chunks. For example, the dividing and separating apparatus 17 may be used to divide the sheet of the food dough F1 into a plurality of sectional sheets.

Figure 12:
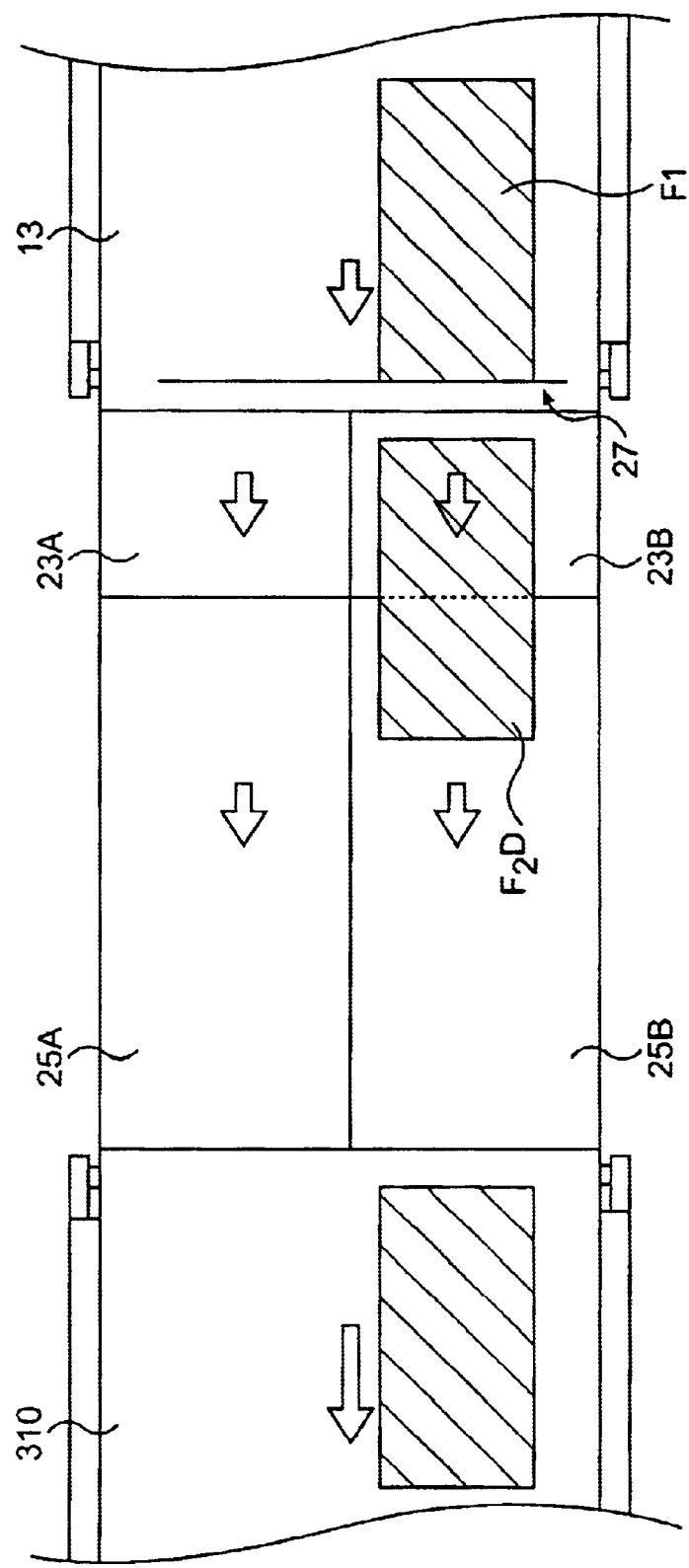
FIG. 12 is a schematic plan view of the food-cutting apparatus of the apparatus for supplying food dough of this invention and a sixth embodiment of the first and second weighing conveyors shown in FIG. 9.

FIG. 12 illustrates the case in which a narrow sheet of food dough F1 is fed by the feeding conveyor 13. In this case, one half of the feeding conveyor 13 is used to convey the sheet of the food dough F1, and it is measured by one of the combinations in series of the first and second weighing conveyor sections 23A, 25A and 23B, 25B.

The widths of the first and second weighing conveyor sections 23A, 23B, 25A, 25B may be decreased to correspond to the width of the sheet of the food dough to be made. In this case, if the sheet is divided into chunks F1D1, F1D2, and if they are separated from each other, they can be shifted out of the first and second weighing conveyor sections 23A, 23B, 25A, and 25B. Thus, it is desired that the first weighing conveyor sections 23A, 23 be arranged so that they can approach or move away from the second weighing conveyor sections 25A, 25B. For example, a bar that has right and left hand screws may be used to engage with the bases of the first and second weighing conveyor sections 23A, 23B, and 25A, 25B.

Also, two conveyors may be used for the linear combinations of the first and second weighing conveyor sections 23A, 25A and 23B, 25B.

Effects of Invention

According to this invention, the dough tissue is not destroyed by the roller mechanism, which comprises a pair of opposing rollers. The sheet of food dough is measured on the conveyors and then cut, so that no stress is generated to the sheet of the food dough when it is divided. Also, just the measurement by the first weighing conveyor can be used to compare it with the preset value when the sheet is divided. Also, the sum of the measurements by the first and second weighing conveyors can be used to divide the sheet. Thus, chunks that are cut from the sheet can have weights within a wide range, so that small chunks and large chunks can be cut out from the sheet.

What is claimed is:

1. A method for supplying food dough comprising of the steps of forming a block of food dough into a sheet that has a given width and thickness, supplying the sheet of the food dough to first and second weighing conveyors serially located along a feeding direction for measuring the weight of a part of the sheet, measuring the weight of a part of the sheet with the first and second weighing conveyors, and cutting the part of the sheet when the sum of the measurements of the first and second weighing conveyors or the measurement of the second weighing conveyor corresponds to a preset value, with a cutting apparatus being located upstream of the first and second weighing conveyors.

2. A method for supplying food dough comprising of the steps of forming a block of food dough into a sheet that has a given width and thickness, supplying the sheet of the food dough to a plurality of first weighing conveyors arranged in parallel, and cutting a part of the sheet when the sum of the measurements of the first weighing conveyors corresponds to a preset value or when the sheet is supplied to second weighing conveyors arranged in parallel and the sum of the measurements of the first and second weighing conveyors corresponds to the preset value or the sum of the measurements of the second weighing conveyors corresponds to the preset value.

* * * * *

UNITED STATES PATENT AND TRADEMARK OFFICE
CERTIFICATE OF CORRECTION

PATENT NO.       : 6,800,313 B2
APPLICATION NO.  : 10/600649
DATED            : October 5, 2004
INVENTOR(S)      : Torahiko Hayashi et al.

It is certified that error appears in the above-identified patent and that said Letters Patent is hereby corrected as shown below:

On the title page item (62), line 1, "Division of application No. 10/336,807, filed on January 6, 2003, now Pat. No. 6,685,457, which is division of application No. 09/959,216, filed as Application No. PCT/JP00/07987 on October 22, 2001, now Pat. No. 6,524,090." should be --Division of application No. 10/336,807, filed on January 6, 2003, now Pat. No. 6,685,457, which is division of application No. 09/959,216, filed as Application No. PCT/JP00/07987 on November 13, 2000, now Pat. No. 6,524,090.--

Signed and Sealed this

Tenth Day of April, 2007

JON W. DUDAS
*Director of the United States Patent and Trademark Office*